No. 122,646. Charles Palmer's Carriage Wheel. Patented Jan. 9, 1872.

Witnesses.

Inventor.
Charles Palmer.
By Hill & Ellsworth.
His Attorneys.

122,646

UNITED STATES PATENT OFFICE.

CHARLES PALMER, OF HAMILTON, NEVADA.

IMPROVEMENT IN CARRIAGE-WHEELS.

Specification forming part of Letters Patent No. 122,646, dated January 9, 1872.

*To all whom it may concern:*

Be it known that I, CHARLES PALMER, of Hamilton, in the county of White Pine and State of Nevada, have invented a new and useful Adjustable Carriage-Wheel; and I do hereby declare the following to be a full, clear, and exact description of the same, reference being had to the accompanying drawing forming part of this specification, in which—

Figure 1:
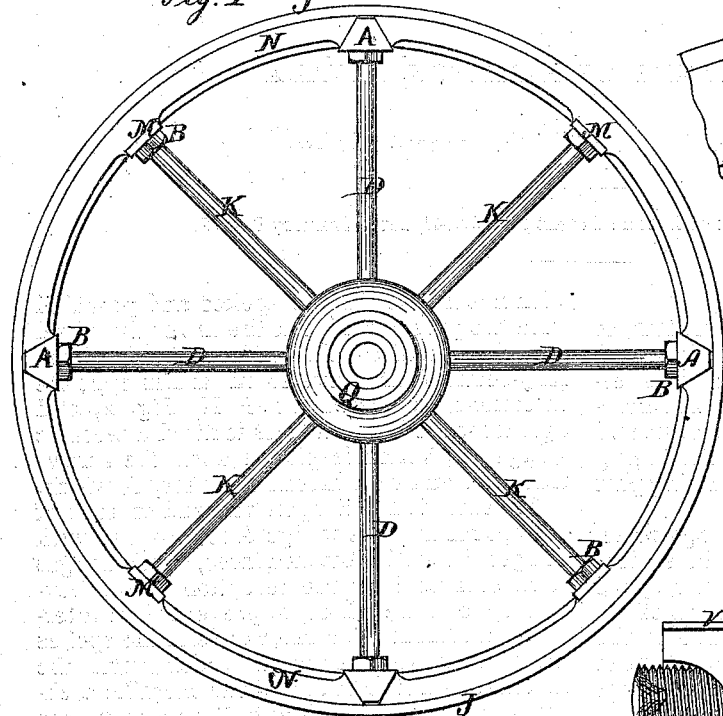
Figure 2:
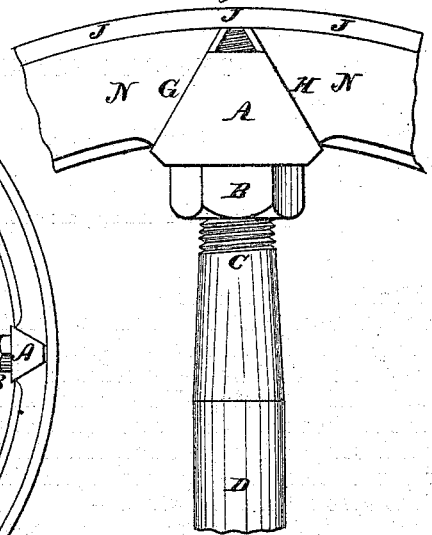
Figure 5:
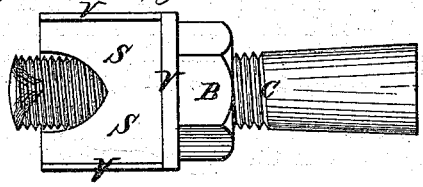
Figure 4:
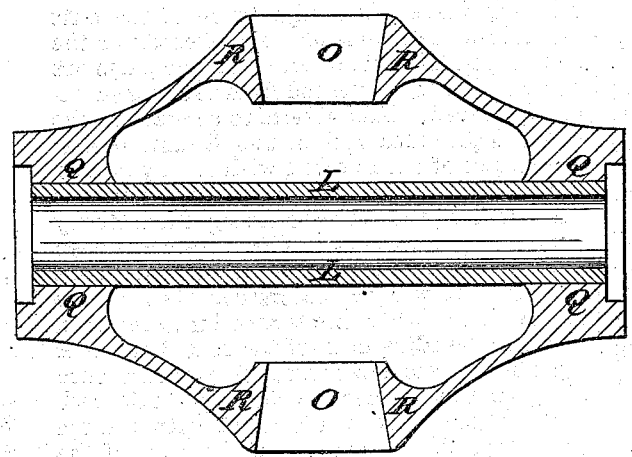
Figure 3:
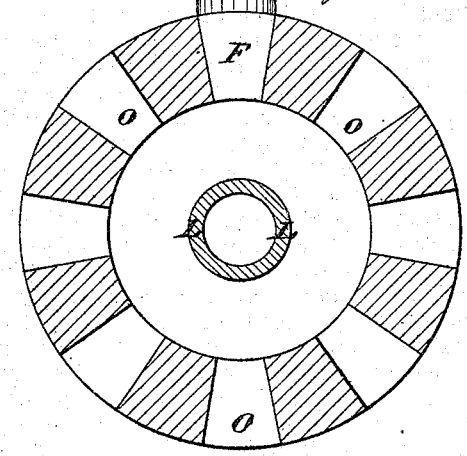

Figure 1 is an elevation of a carriage-wheel constructed in accordance with my invention. Fig. 2 is a detached sectional view of a spoke and felly. Fig. 3 is a transverse section of the hub. Fig. 4 is a longitudinal section of the same; and Fig. 5 is a detached view of one of the spokes, showing the device by which it is applied to the fellies.

Similar letters of reference indicate corresponding parts in the several figures of the drawing.

My invention has for its object to provide an improved carriage-wheel whose parts can be adjusted at pleasure to compensate for expansion and contraction under the varying influence of the weather, and whereby the fellies are held firmly in place against the tire, and the spokes firmly within the hub. To the accomplishment of these ends, my invention consists, first, in the construction of a screw-socket provided with a nut and wedge, the latter fitting between the adjacent beveled ends of two sections of the felly, the socket being fitted upon the outer end of the spoke, whose inner end rests in a mortise in the metal hub formed to receive it. By adjusting the nut the wedge is forced outward, expanding the fellies—that is to say, moving them circumferentially of the wheel, and consequently tightening them against the tire, and at the same time forcing the inner end of the spoke firmly within the hub. The invention further consists in the combination, with the metallic hub, the adjustable wedge, and the expanding fellies, of intermediate spokes provided with a screw-thread, a nut, and washer, whereby, as the nut is adjusted, it forces the washer against the inner face of the fellies, to hold them outward against the tire after they have been moved longitudinally by the adjustment of the wedge.

In the accompanying drawing, Q R is the metallic shell composing the wheel hub, cast with mortises O for the spokes and provided with the pipe-box L. J is the tire of the wheel and N the fellies. The adjacent ends of the felly-sections are beveled inward in opposite directions, as shown at G H, Fig. 2, and against these beveled faces is fitted a metallic wedge, A, which is placed upon the screw-threaded end of a metallic socket, C, which, in its turn, is fitted upon the end of each of the spokes D. The wedge A is provided with flanges V upon its beveled faces, which flanges form sockets S for the reception of the beveled ends of the fellies, to prevent their lateral displacement. The inner ends of the spokes are formed with tenons F which enter the mortises O in the hub, and the metallic sockets C are provided with nuts B under the base of the wedges. By adjusting these nuts the wedges are moved out or in upon the sockets to tighten or loosen the fellies. When the wedges are moved outward they press against the ends of the fellies, moving them circumferentially of the wheel, expanding the diameter of the same, as far as this is possible, within the tire, and consequently holding the latter firmly in place. The adjustment of the nuts also forces the tenons of the spokes within the mortises in the hub, whereby all the parts are tightened and prevented from rattling or being displaced. Each alternate spoke K in the wheel is provided with a nut, B, and washer M in place of the nut and wedge. By adjusting the nut the washer is forced against the inner face of the fellies, holding them firmly outward against the tire after they have been moved longitudinally by the adjustment of the wedges. It will be understood that all the spokes in the wheel are tenoned into the hub, and that the adjustment of the nuts B, whether against the washers or wedges, tightens such spokes in their respective mortises. If desired, the sockets C may be dispensed with and the screw-threads cut directly on the ends of the spokes, which in this case must be made of metal.

By my invention a wheel can be loosened in wet and tightened in dry weather, keeping it at all times in that condition necessary for its preservation, compensating for contraction and expansion and preventing the rattling of the parts by wear or other causes.

Having thus described my invention, what I claim as new is—

1. The flanged wedge A, nut B, screw-socket C, and spoke D, in combination with the beveled fellies N, the tire J, and metallic hub Q R, all constructed and arranged substantially as described, and for the purpose specified.

2. In combination with the expanding fellies N, the adjustable wedges A upon the spokes D, and the metallic hub Q R, I claim the spokes K with their nuts B and washers M, all constructed and arranged substantially as described, for the purpose specified.

CHARLES PALMER. [L. S.]

Signed and sealed in the presence of—
 N. WESCOATT,
 CHAS. H. SEYMOUR.

Hamilton, White Pine county, Nevada, 29th December, 1870.